United States Patent [19]

Gabriel et al.

[11] Patent Number: 4,624,598
[45] Date of Patent: Nov. 25, 1986

[54] TABLE LOCKING PLUGS

[75] Inventors: Edmond Gabriel, New City; Edmund Killian, Merrick, both of N.Y.

[73] Assignee: Finkel Outdoor Products, Inc., New York, N.Y.

[21] Appl. No.: 766,597

[22] Filed: Aug. 19, 1985

[51] Int. Cl.⁴ .............................................. F16D 1/00
[52] U.S. Cl. ...................................... 403/24; 403/192; 248/188.7; 108/150
[58] Field of Search ................. 403/192, 199, 187, 24; 248/188.7, 188; 108/150

[56] References Cited
U.S. PATENT DOCUMENTS
3,312,355 4/1967 Steinmetz ..................... 248/188.7 X Primary Examiner—Andrew V. Kundrat
Attorney, Agent, or Firm—McAulay, Fields, Fisher, Goldstein & Nissen

[57] ABSTRACT

A table leg locking plug is provided with a planar stop member, a tubular member receptive of one end of the table leg and extending outwardly from one surface of the stop member with the longitudinal axis thereof perpendicular to the one surface and two resiliently deformable ears extending outwardly from the periphery of the tubular member and on which a table top lies during use.

4 Claims, 7 Drawing Figures

TABLE LOCKING PLUGS

BACKGROUND OF THE INVENTION

The present invention relates to a table locking plug for outdoor tables and the like which are to be assembled.

Outdoor furniture, in particular tables, are generally supplied in an unassembled condition and must be assembled by connecting the legs and table top thereto. Because the tables are to be assembled by unskilled personnel or the ultimate consumer, there is a need for a simple yet reliable device for locking together the portions of a table of this type. Additionally, most tables of this type contain a glass or plastic top or a similar material which is of variable thickness due to the tolerances imparted to the top because of the nature of the method of manufacture. Accordingly, some means must be provided for locking the table top in place while compensating for the variable thickness top.

SUMMARY OF THE INVENTION

The main object of the present invention is to provide a table locking plug which is capable of locking the table legs into a table rim and to simultaneously act as a leaf spring to support the variable thickness table top so as to eliminate shaking of the table top, which is highly undesirable.

These and other objects of the present invention are achieved in accordance with the present invention by a table locking device having a planar stop member, a tubular member receptive of an end of a table leg and extending outwardly from one surface of the stop member with the longitudinal axis thereof perpendicular to that surface and two resiliently deformable ears extending outwardly from the periphery of the tubular member and on which a table top can lie. The stop member, tubular member and ears preferably comprise an integral piece of plastic, preferably polypropylene. The device can be used with either rectangular legs or circular legs, by making the cross section of the tubular member either rectangular or circular.

These and other features and advantages of the present invention will be more clearly understood with reference to the following detailed description and the attached drawings:

DETAILED DESCRIPTION OF THE INVENTION

Referring to FIGS. 1-4, the device 1 in accordance with the present invention includes a planar stop member 13 with a tubular member 11 extending outwardly from one surface of the stop member 13 with its longitudinal axis perpendicular to the surface of stop member 13.

Figure 2:
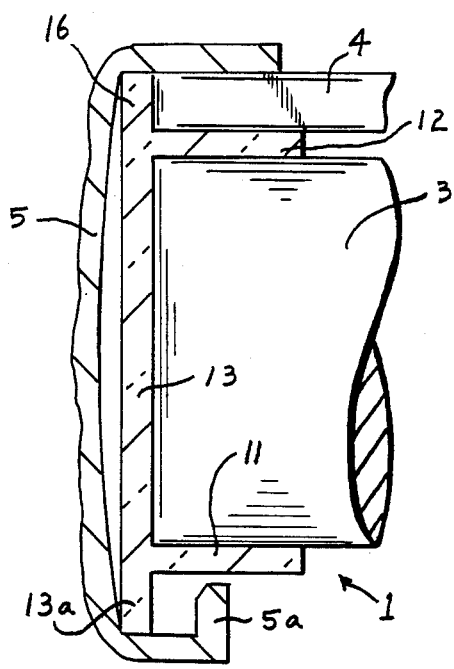
FIG. 2 is a cross-sectional view of the device of FIG. 1 in place on a table.

Stop member 13 also includes a top portion 16 against which the edge of a table top 4 is to abut and a lower portion 13a which is used to lock the stop member into a table rim 5 and particularly the flange portion 5a thereof as is shown in FIG. 2.

Figure 1:
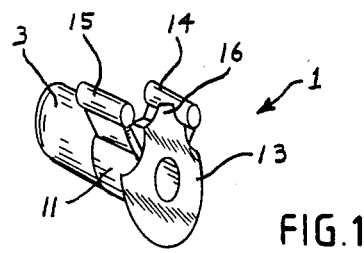
FIG. 1 is a perspective view of one embodiment of the device according to the present invention to reduced scale.

The tubular member 11 receives a table leg end 3 as shown in FIGS. 1 and 2.

The device 1 also includes ears 14, 15 which extend radially outwardly from the periphery of tubular member 11 and are elastically deformable in response to the weight of the table top 4 resting thereon. The ears preferably are located at an angle of 45° to the horizontal and terminate with upwardly extending fingers 14a, 15a, respectively, of greater thickness than the connecting portions. Tubular member 11 also includes a projecting seat 12 between the ears on which the table top abuts upon deformation of ears 14 and 15. The stop member portion 13a also includes cutouts 18 at the location of ears 14, 15 to accommodate flexure of the ears.

Figure 4:
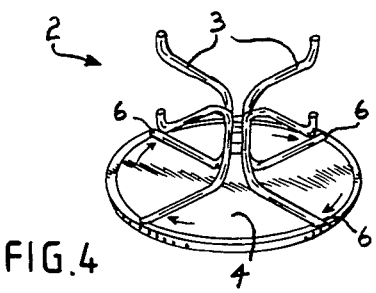
FIG. 4 shows the assembly of a table with the devices in place to reduced scale.

In use, legs 3 are interconnected at a central portion thereof as shown in FIG. 4 and each free end of the legs 3 receives one locking plug 1 thereon with the ears 14, 15 and the top portion 16 facing upwardly. The table top 4 with the rim 5 disposed therearound is placed on the ground with the top surface of the table top 4 facing downwardly. The rim 5 is provided with notches 6 at the locations of the legs as shown in FIG. 4. The leg assembly with the locking devices thereon is flipped upside-down and placed over the table rim and table top preferably made of glass. The table legs with the plastic locking plugs are aligned with the notches 6 of the rim and the end of the table leg with the plastic locking device is pushed into the notched table rim by deforming the ears 14, 15 and the leg assembly is shifted to the right as shown by the arrows in FIG. 4.

Upon completing this operation, the table is turned rightside-up and the rim, legs, and table top are locked into place as is shown in FIG. 2. Because there is usually some tolerance between the rim and table top, the upward spring force of the ears keeps the table top tightly in place to prevent shaking.

Figure 5:
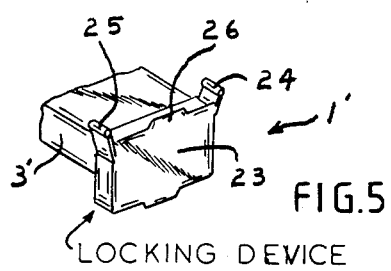
FIG. 5 shows another embodiment of the device according to the present invention to reduced scale.
Figure 3:
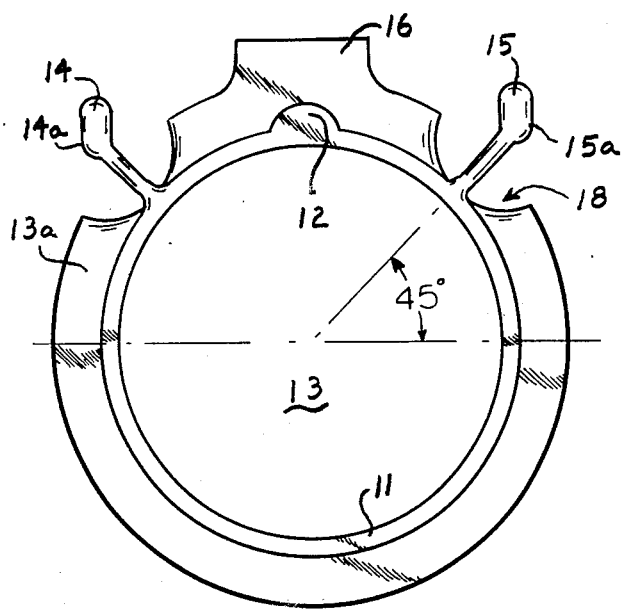
FIG. 3 is a front view of the device of FIG. 1.
Figure 7:
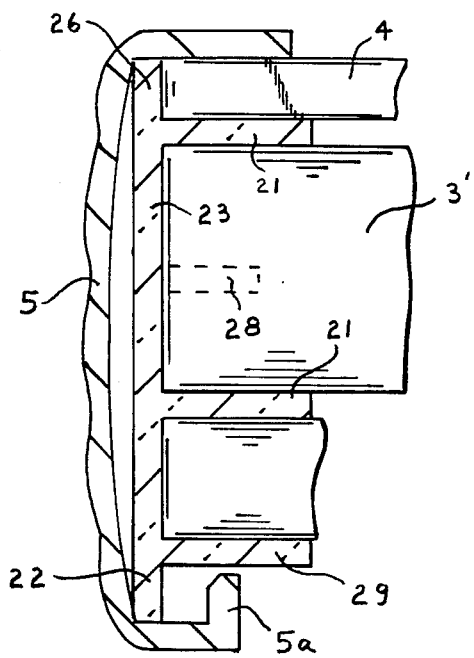
FIG. 7 is a cross-sectional view of the device of FIG. 5 in place on a table.
Figure 6:
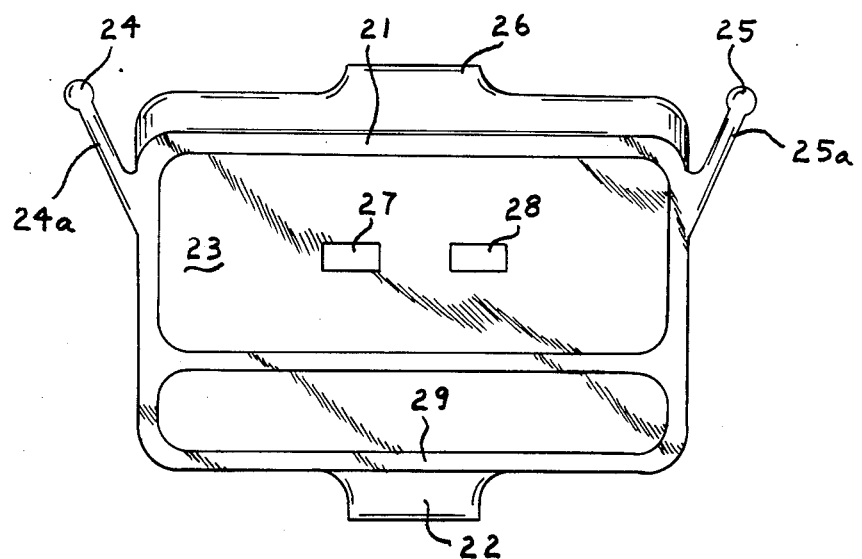
FIG. 6 is a front view of the device of FIG. 5.

When legs 3' having a rectangular cross section are to be used, the embodiment of the locking device 1' shown in FIGS. 5-7 is employed. The device includes the planar stop member 23 having the tubular member 21 extending therefrom and having a rectangular cross section. The stop member 23 includes a top portion 26 for abutting against the edge of the table top 4 and the bottom portion 22 for engaging the rim 5.

The device also includes ears 24a, 25a which extend outwardly from the periphery of tubular portion 21 and are provided with enlarged ends 24, 25, respectively. The ears are preferably positioned at 30° to the vertical.

The device further includes inwardly projecting portions 27, 28 for engaging holes in the ends of the legs and a lower tubular portion 29 for providing further strength.

The locking device 1' is attached to the ends of legs 3' and assembled onto the table top and rim in the same way as the embodiment of FIGS. 1-4.

It will be appreciated that the instant specification and claims are set forth by way of illustration and not limitation, and that various modifications and changes may be made without departing from the spirit and scope of the present invention.

What is claimed is:

1. A table leg locking device comprising: a planar stop member, a tubular member receptive of an end of a table leg extending outwardly from one surface of the stop member with the longitudinal axis thereof perpendicular to the one surface, and two resiliently deformable ears extending outwardly from the periphery of the tubular member and on which a table top lies.

2. The device according to claim 1, wherein the stop member, tubular member and ears comprise an integral one piece plastic unit.

3. The device according to claim 1, wherein the tubular member has a rectangular cross section.

4. The device according to claim 1, wherein the tubular member has a circular cross section.

* * * * *